United States Patent Office 3,794,610
Patented Feb. 26, 1974

3,794,610
PLASTICIZED ANAEROBIC COMPOSITION
Andrew G. Bachmann, Weatogue, Conn., assignor to Loctite Corporation, Newington, Conn.
No Drawing. Filed Aug. 9, 1971, Ser. No. 170,377
Int. Cl. C08f 29/46, 29/50
U.S. Cl. 260—31.6                                              10 Claims

ABSTRACT OF THE DISCLOSURE

Anaerobic compositions possessing improved properties in numerous respects are disclosed, comprising a polymerizable acrylate ester monomer, a peroxy polymerization initiator, and a polymeric plasticizer, specifically a polyester plasticizer having a molecular weight between about 2,000 and about 15,000 and which is substantially aliphatic in character.

BACKGROUND OF THE INVENTION

Anaerobic compositions are catalyzed, polymerizable mixtures which generally function as adhesives or sealants for the joining of nonporous surfaces. A prime reason for the great popularity of these compositions is their unique inhibition mechanism. As long as the compositions remain in contact with adequate amounts of oxygen, such as atmospheric oxygen, polymerization or cure of the composition will not commence even though the composition contains a significant amount of a room temperature polymerization initiator.

When the anaerobic composition is placed between surfaces which are relatively impervious to oxygen, however, the stabilizing effect of the atmospheric oxygen is removed and cure commences within a relatively short time. The products conventionally are sold in partially empty, low-density polyethylene bottles. As the bottle is pervious to atmospheric oxygen, the liquid is continuously contacted by fresh oxygen through the bottle walls and from the air space in the bottle. As a result, it is possible to precatalyze a polymerizable composition which can be used as a single component sealant or adhesive, and still have the composition remain in the stable, uncured state for periods of one year or longer prior to use.

It has been known previously to add conventional plasticizers to anaerobic compositions, as disclosed, for example, in U.S. Pats. 3,300,547 to Gorman et al., issued Jan. 24, 1967, and 3,419,512 to Lees et al., issued Dec. 31, 1968.

Anaerobic compositions generally, and plasticized anaerobic compositions in particular, would find application much more readily in today's industry if improvements could be provided in a number of critical performance areas. One of the most important is in the "break/prevail torque ratio" of the cured product when used on cylindrical parts, such as mated threaded members and particularly threaded fasteners. The break/prevail torque ratio easily can be determined by the use of standard threaded fasteners which have been sealed or bonded in their mated or assembled form by the anaerobic composition. The torque required to produce the first relative movement between the two sealed or bonded threaded parts is determined, and this figure is called the "break torque." The amount of torque required to thereafter produce continuing movement between the two threaded members, such as the average torque required to produce one full revolution of one member relative to the other, is determined and is called the "prevailing torque." The ratio of the former to the latter is the "break/prevail torque ratio."

A break/prevail ratio of less than one has been inherent in essentially all anaerobic compositions to date. A much more desirable situation exists if the break to prevail ratio is greater than one. In order to provide the maximum utility in essentially all applications for anaerobic compositions on cylindrical parts, and particularly threaded parts, prevention of all relative movement between the two parts' members should be prevented, and hence the ability to control the break torque is important, as is the ability to produce break torques as high as possible. Conversely, as long as significant prevailing torque exists, the prevailing torque generally should be substantially less than the break torque. This permits easier separation of the parts for adjustment, repair, etc., and prevents the need for excessive torque which may damage the threads or other parts of the assembly. Anaerobic compositions which possessed a break to prevail ratio of greater than one would be extremely novel and useful compositions of matter.

Among other significant areas where improvements would materially benefit anaerobic compositions, and adhesive and sealant assembly practice in general, are: resistance to solvents, particularly commonly encountered organic fluids such as chlorinated hydrocarbons, etc., and hot solvents such as hot water; resistance to thermal degradation, since this would permit usage on parts which would be subjected to increased temperatures; resistance to shrinkage upon cure, since this would reduce the tendency of the curing sealant or adhesive to pull away from the parts which are to be sealed or bonded, or possibly changing the dimensions or configuration of the bonded or sealed joint; impact resistance, as this would make the bonded or sealed joints considerably more durable, particularly under vibration or impact loading; and freedom from variation of the properties of the cured composition with age. Anaerobic compositions which provided significant benefits in all or any of these respects would be extremely novel and useful compositions of matter.

THE INVENTION

The compositions of the invention described herein provide significant benefits in many or all of the areas of the preceding paragraphs. These advantages are obtained without significant adverse effect upon the other desirable properties of the uncured or cured anaerobic composition. For example, the uncured anaerobic composition still retains excellent stability, speed of cure, etc., which properties are discussed in greater detail below.

The invention deals with compositions which are composed of polymerizable acrylate ester monomers, peroxy polymerization initiators for said monomer which are capable of polymerizing the monomer in the substantial absence of oxygen at room temperature, and from about 10% to about 30%, by weight, of the anaerobic composition of a soluble polyester plasticizer having a molecular weight between about 2,000 and about 15,000, said polyester plasticizer being primarily aliphatic in character. By "primarily aliphatic in character," it is meant that the polyester plasticizer should be sufficiently free of carbocyclic entities that its physical properties (viscosity, solubility, etc.) are not substantially different from the physical properties of purely aliphatic polyesters of comparable molecular weight. It has been found that satisfactory properties are obtained when the molecular weight of the carbocyclic entities do not comprise more than about 20% of the molecular weight of the polyester plasticizer, and preferably not more than about 10%.

The invention also deals with the method of improving anaerobic compositions comprising the above-described acrylate ester monomer and peroxy initiator, by adding thereto from about 10% to about 30% by weight of the total composition of the above-described polyester plasticizer.

The invention also concerns sealed or bonded surfaces, said surfaces being sealed or bonded with the above anaerobic composition containing the specifically described polyester plasticizer. In a highly preferred embodiment of this aspect of the invention, the surfaces are mated threaded surfaces.

DISCUSSION OF THE INVENTION AND ITS PREFERRED EMBODIMENTS

As used above, the "polyester" refers to the classical usage of the term, e.g., compounds prepared by the condensation of a dibasic acid and a diol to form a thermoplastic polymer having a plurality of ester linkages in the basic molecular chain. This definition does include polymeric compounds of the same structure prepared by equivalent methods, such as when an acid anhydride is substituted for the above-mentioned dibasic acid.

The reasons for the particular benefits encountered with the specific polyester plasticizers of the invention disclosed herein are not known with particularity, and hence there is no intention to be bound to any particular technical theory. However, it is believed that among the important favorable characteristics and parameters are the following: high solubility or compatibility of the polyester plasticizer in both the uncured and cured anaerobic compositions (low degree of syneresis and low degree of migration from the cured composition with time); appropriate length of polyester plasticizer chain; predominantly aliphatic nature of the polyester plasticizer; and relative balance between the polyester plasticizer and other ingredients in the anaerobic composition.

The appropriate balance of all the above factors appears to be obtained generally when the polyester plasticizer has a molecular weight between about 2,000 and 15,000, preferably about 2,500 to about 10,000, and the polyester plasticizer possesses the aliphatic character previously described. It also has been found highly preferred for the polymeric plasticizer to be substantially saturated, e.g., the primary dibasic acid and diol from which the polyester is derived are both substantially free of carbon to carbon double or triple bonds. In another preferred aspect the primary dibasic acid and diol from which the polyester is prepared are of relatively low molecular weights, so as to provide a relatively large number of repeating ester linkages. Considering the basic repeating unit of the polyester plasticizer to be

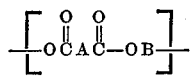

wherein A and B respectively represent the remaining atoms of the dibasic acid and diol from which the polyester structure is formed, it is preferred that this repeating unit has a molecular weight of not greater than about 300, and most preferably not greater than about 225. Most preferably, A and B are hydrocarbon in nature.

Typical examples of suitable polyester plasticizers are polyesters within the above-described molecular weight limits, prepared from the following dibasic acids and diols: dibasic acids: adipic acid, azelic acid, glutaric acid, and succinic acid; diols: ethylene glycol, propylene glycol, butylene glycol, neopentyl glycol. As will be apparent to the skilled worker in the art, the above examples of dibasic acids and diols are only representative, and large numbers of such materials are available which can be and are used in preparing a wide variety of polyester compounds. The scope of this invention is intended to encompass all of such polyester compounds which otherwise meet the above criteria for operability within the compositions of the inventions disclosed herein. Naturally, mixtures of either or both of dibasic acids or diols can be used if such is desired.

The anaerobic composition

As indicated above, the anaerobic composition has as required elements a polymerizable monomer and a peroxy initiator therefor which is latent in the presence of oxygen, but which is capable of polymerizing the monomer at room temperature within a reasonable period of time after removal of the inhibiting effect of oxygen.

The most desirable monomers for use in anaerobic compositions are polymerizable acrylate esters. When used in the products of this invention, preferably at least a portion of the acrylate monomer is a di- or other polyacrylate ester. These poly-functional monomers produce cross-linked polymers, which serve as more effective and more durable sealants and adhesives.

The polyacrylate esters may be represented by the formula (1) 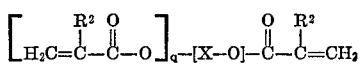

wherein $R^2$ is a radical selected from the group consisting of hydrogen, halogen and alkyl of from 1 to about 4 carbon atoms; $q$ is an integer equal to at least 1, and preferably equal to from 1 to about 4; and X is an organic radical containing at least two carbon atoms and having a total bonding capacity of $q$ plus 1. With regard to the upper limit for the number of carbon atoms in "X," workable monomers exist at essentially any value. As a practical matter, however, a general upper limit is about 50 carbon atoms, preferably 30, and most preferably about 20.

For example, X can be an organic radical of the formula

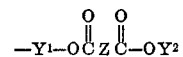

wherein each of $Y^1$ and $Y^2$ is an organic radical preferably a hydrocarbon group, containing at least 2 carbon atoms, and preferably from 2 to about 10 carbon atoms, and Z is an organic radical, preferably a hydrocarbon group, containing at least 1 carbon atom, and preferably from 2 to about 10 carbon atoms. Other classes of useful polyacrylate ester monomers are the isocyanate-monoacrylate reaction products described in U.S. Pat. 3,425,988 to Toback and Gorman, issued Feb. 4, 1969, and the reaction products of di- or tri-alkylolamines (e.g., ethanolamines or propanolamines) with acrylic acids, such as are disclosed in French Pat. No. 1,581,361.

The most highly preferred acrylate esters which can be used in the compositions disclosed herein are polyacrylate esters which have the following general formula:

(2) 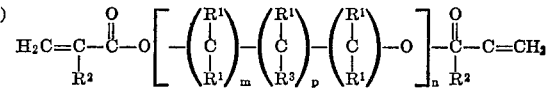

wherein $R^1$ represents a radical selected from the group consisting of hydrogen, lower alkyl of from 1 to about 4 carbon atoms, hydroxy alkyl of from 1 to about 4 carbon atoms, and

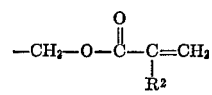

$R^2$ is a radical selected from the group consisting of hydrogen, halogen, and lower alkyl of from 1 to about 4 carbons atoms; $R^3$ is a radical selected from the group consisting of hydrogen, hydroxyl, and

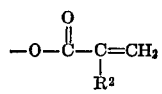

$m$ is an integer equal to at least 1, e.g., from 1 to about 15 or higher, and preferably from 1 to about 8 inclusive; $n$ is an integer equal to at least 1, e.g., 1 to about 40 or more, and preferably between about 2 and about 10; and $p$ is one of the following: 0, 1.

Typical examples of polyacrylate esters corresponding to the above general formula are di-, tri- and tetraethyleneglycol dimethacrylate; di(pentamethyleneglycol) dimethacrylate; tetraethyleneglycol diacrylate; tetraethylenglycol di(chloroacrylate); diglycerol diacrylate; diglycerol tetramethacrylate; butyleneglycol dimethacrylate; neopentylglycol diacrylate; and trimethylolpropane triacrylate.

While di- and other polyacrylate esters—and particularly the polyacrylate esters described in the preceding paragraphs—have been found particularly desirable, monofunctional acrylate esters (esters containing one acrylate group) also may be used. When dealing with monofunctional acrylate esters, it is highly preferable to use an ester which has a relatively polar alcoholic moiety. Such materials are less volatile than low molecular weight alkyl esters and, more important, the polar group tends to provide intermolecular attraction during and after cure, thus producing more desirable cure properties, as well as a more durable sealant or adhesive. Most preferably the polar group is selected from the group consisting of labile hydrogen, heterocyclic ring, hydroxy, amino, cyano, and halogen polar groups. Typical examples of compounds within this category are cyclohexylmethacrylate, tetrahydrofurfuryl methacrylate, hydroxyethyl acrylate, hydroxypropyl methacrylate, t-butylaminoethyl methacrylate, cyanoethylacrylate, and chloroethyl methacrylate.

As indicated above the anaerobic compositions as discussed herein are prepared by mixing a peroxy initiator with one or more acrylate esters as described above. While certain peroxides (generally dialkyl peroxides) have been disclosed as useful initiators in, e.g., U.S. Pats. 3,419,512 to Lees, issued Dec. 31, 1968 and 3,479,246 to Stapleton issued Nov. 18, 1969, the hydroperoxides are highly superior and constitute a highly preferred embodiment.

The real benefit of the non-hydroperoxide initiators is as a co-initiator with the hydroperoxides to make the cure properties of the anaerobic composition more universal.

Hydrogen-peroxide may be used, but the most desirable polymerization initiators are the organic hydroperoxides. Included within this definition are materials such as organic peroxides or organic peresters which decompose or hydrolyze to form organic hydroperoxides in situ. Examples of such peroxides and peresters are cyclohexyl hydroxycyclohexyl, peroxide and t-butyl perbenzoate, respectively.

While the nature of the organic hydroperoxides is not critical to the broad concept of this invention, the general class of hydroperoxides can be represented by the formula $R^4OOH$, wherein $R^4$ generally is a hydrocarbon group containing up to about 18 carbon atoms, and preferably is an alkyl, aryl or aralkyl hydrocarbon group containing from about 3 to about 12 carbon atoms. Naturally $R^4$ can contain any substituent or linkage, hydrocarbon or otherwise, which does not affect the hydroperoxide adversely for the purpose disclosed herein. Typical examples of such organic hydroperoxides are cumene hydroperoxide, tertiary butyl hydroperoxide, methylethylketone hydroperoxide, and hydroperoxides formed by oxygenation of various hydrocarbons such as methylbutene, cetane, and cyclohexene, and various ketones and ethers, including certain compounds represented by the General Formula 2 above.

The organic hydroperoxide initiators can be used within wide ranges, e.g., up to about 20% by weight of the composition. Most commonly, however, they comprise no more than about 10 percent by weight of the composition since above that level adverse effects on the strength and durability of the cured composition may be experienced. While in some instances lower amounts can be used, about 0.1% by weight of the composition is a common lower limit. Preferably the hydroperoxide initiator comprises from about 0.1% to about 5% by weight of the composition.

Common additives for anaerobic compositions are latent polymerization accelerators, compounds which do not of themselves initiate cure, but which accelerate the cure once it has been started by the polymerization initiator. It should be noted that larger numbers of polymerization accelerators are known in the art, and the broad concept of this invention is intended to encompass any polymerization accelerator which can be incorporated in the anaerobic composition without destroying the essential characteristics of such composition.

Among the earliest of the polymerization accelerators used in anaerobic composition were amines. The most commonly used are tertiary amines such as tributylamine and triethylamine. Essentially the entire class of tertiary amines can be used in such compositions, and the class may be broadly represented by the formula $$NR^5R^6R^7$$

wherein each of $R^5$, $R^6$ and $R^7$ is a hydrocarbon group containing up to about ten carbon atoms. Naturally the hydrocarbon groups can contain any substituent or linkage which does not adversely affect the workability of the amine to perform its intended function. Preferably, each of $R^5$, $R^6$ and $R^7$ is an alkyl, aryl or aralkyl group containing up to about 8 carbon atoms.

The N,N-dialkyl aryl amines are particularly effective tertiary amines. Typical amines within this class may be represented by the following general formula:

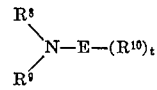

wherein E represents a carbocyclic aromatic nucleus selected from the group consisting of phenyl and naphthyl radicals; $R^8$ and $R^9$ are hydrocarbon groups containing up to about 10 carbon atoms, and preferably are lower alkyl radicals of 1 to 4 carbon atoms; $t$ is one of the following: 0, integer equal to from 1 to 5 inclusive; $R^{10}$ is a hyrocarbon group containing up to about 5 carbon atoms, and preferably is a member selected from the groups of lower alkyl and lower alkoxy radicals of 1 to 4 carbon atoms inclusive, provided that when an $R^{10}$ radical is in the ortho position, $t$ is greater than 1.

Primary and secondary amines also can be used as accelerators in the anaerobic compositions of this invention. Particularly good primary and secondary amines are the primary and secondary alkyl amines, most particularly those wherein each alkyl group contains up to about 10 carbon atoms. A separate and highly preferred class of secondary amines has been found to be the class of heterocyclic secondary amines, particularly heterocyclic secondary amines containing up to about 20 carbon atoms. It also is preferred to use those amines wherein the heterocyclic ring is hydrogenated. Typical of such compounds are pyrrolidine, piperazine and 1,2,3,4-tetrahydroquinoline.

Another highly successful class of accelerators is the organic sulfimides, i.e., organic compounds which contain the group

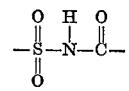

Because of the extreme effectiveness of the sulfimides as accelerators for anaerobic compositions, compositions containing sulfimides constitute a highly preferred embodiment of the invention disclosed herein. While the broad class of organic sulfimides can be used successfully, the sulfimides most commonly used can be represented by the formula

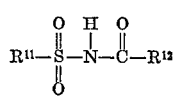

wherein each of $R^{11}$ and $R^{12}$ is a hydrocarbon group containing up to about ten carbon atoms, and preferably up to about six carbon atoms. Naturally $R^{11}$ and $R^{12}$ can contain any linkage or substituent which does not adversely affect the sulfimide for its intended use in the anaerobic composition. Further, $R^{11}$ and $R^{12}$ can be united to bond the sulfimide group in a heterocyclic ring, or a polynuclear heterocyclic ring system. Of the organic sulfimides, benzoic sulfimide has been found to be the most preferable.

An even more highly preferred composition is that which contains a sulfimide, particularly benzoic sulfimide, in combination with either a heterocyclic secondary amine or a tertiary N,N-dialkyl aryl amine, both of which are described above. For an expanded discussion of this type of system, reference is made to U.S. Pat. 3,218,305 to Krieble, issued Nov. 16, 1965.

Other less active acceleration can be used in the compositions of this invention. Typical examples of such accelerators are succinimide, phthalamide and formamide.

Routine testing easily will determine the optimum amount of accelerator which can be incorporated in a given anaerobic composition. However, the following general guidelines may be used. With regard to tertiary amines, large amounts may be used if desired, up to about 8 percent by weight of the composition, or higher. However, little if any additional benefit is obtained above about 5 percent. Most preferably these tertiary amine accelerators are used at from about 1 percent to about 4 percent by weight of the anaerobic composition. The succinimide, phthalamide and formamide accelerators also can be used in significant amounts, up to about 8 percent by weight of the composition, or higher, and preferably from about 1 percent to about 5 percent by weight. The sulfimide and heterocyclic secondary amine accelerators generally are used at less than about 4 percent by weight of the anaerobic composition. In the special case where a sulfimide is used in combination with a heterocyclic secondary amine of an N,N-dialkyl arylamine, the total of the two accelerators preferably does not exceed about 4 percent by weight of the anaerobic composition, and either component does not exceed about 3 percent by weight.

Other ingredients can be used in the anaerobic compositions of this invention, and in its preferred aspects polymerization inhibitors are included to offer protection against spurious polymerization prior to the time of intended use. The quinones have been found to be a particularly effective class of polymerization inhibitors, and can be used herein. Examples of such quinones are $\beta$-naphthoquinone, 2-methoxy-1,4-naphthoquinone, and p-benzoquinone.

Other typical ingredients which can be used if desired to impart commercially desirable properties to the composition are thickeners, dyes, adhesive agents and thixotropic agents. Such materials can be used in such combination and proportions as desired, provided they do not adversely affect the anaerobic nature of the composition, or other essential properties thereof. While exceptions may exist in some cases, these materials in toto generally do not comprise more than about 50% by weight of the total composition, and preferably not more than about 20% by weight of the composition. The above-described anaerobic compositions generally can be prepared by the use of any conventional mixing techniques since the polyester plasticizers tend to be quite soluble in the remainder of the ingredients of the anaerobic composition. Certain other ingredients which may desirably be added do not possess this ready solubility, and if such additives are used (e.g., silica) it may be desirable to use high shear mixing.

EXAMPLES

The following examples are given to demonstrate processes, compositions and bonded assemblies within the scope of the invention disclosed herein. The examples are not intended to be limitations in any way upon the scope of the invention. Unless specifically stated to the contrary, all ratios and percentages in the following examples are expressed on a weight basis.

Example I

Anaerobic Composition I was prepared, having the following approximate composition:

| Ingredient | Approx. weight percent |
|---|---|
| Polyethyleneglycol dimethacrylate (avg. molecular weight=330) | 94.5 |
| Cumene hydroperoxide | 3.0 |
| Benzoic sulfimide | 1.6 |
| Diethyl p-toluidene | 0.6 |
| Dimethyl o-toluidene | 0.3 |
| 1,4-naphthoquinone | (1) |

[1] 100 parts per million by weight.

A portion of Anaerobic Composition I then was used as a control, and other portions thereof were mixed with various polyester plasticizers to prepare anaerobic compositions within the scope of the invention disclosed herein. In each case, 80 parts by weight of Anaerobic Composition I were mixed with 20 parts by weight of the polyester plasticizer. The various polyester plasticizers are tabulated in Table I below, along with the "break/prevail torque ratio" for the various compositions. The break/prevail torque ratio was determined by placing several drops of the composition being tested upon the threads of a standard ⅜-24 steel bolt, and assembling a mating nut thereover. As anaerobic conditions existed between the mating threads of the nut and bolt, the compositions shortly began to cure. The nuts and bolts were set aside for 24 hours to allow essentially full cure to take place. Thereafter, the nut and bolt assemblies were disassembled with a standard torque wrench, during which the break and prevailing torques were measured. As indicated above, the torque at which the first relative movement between the nut and bolt is noted is considered to be the "break torque" value, and the average torque required to produce one revolution of the bolt relative to the nut is considered the prevailing torque.

TABLE I

| Sample | Polyester plasticizer | Foot pounds Break torque ratio | Foot pounds Prevail torque ratio | Break/ prevail torque ratio |
|---|---|---|---|---|
| 1 (Control) | None | 7 | 22 | 0.3 |
| 2 | "Hall HA-5", a polyester of a mixture of $C_5$-$C_9$ dibasic acids and ethylene glycol. | 15 | 5 | 3.0 |
| 3 | "Marflex P-50", a saturated polyester with approx. molecular weight=ca. 6,000. | 16 | 6 | 2.7 |
| 4 | "Marflex P-50A", a saturated polyester with avg. molecular weight=ca. 3,000. | 18 | 7 | 2.6 |
| 5 | "Paraplex G-25", an aliphatic polyester with avg. molecular weight= ca. 8,000. | 14 | 4 | 3.5 |
| 6 | "Paraplex G-53", an aliphatic polyester with avg. molecular weight= ca. 3,300. | 15 | 8 | 1.9 |
| 7 | "Harflex 330", poly(1,3-butylene glycol adipate) with avg. molecular weight=ca. 2,000. | 15 | 4 | 3.8 |
| 8 | "Harflex 321", poly(propyleneglycol adipate) with avg. molecular weight= ca. 2,000. | 10 | 6 | 1.7 |
| 9 | "Eastman P-10", poly(neopentylglycol adipate). | 15 | 8 | 1.9 |
| 10 | "Plastolein 9776", a saturated polyester of a low molecular weight glycol and azeleic acid. | 20 | 8 | 2.3 |

Example II

Anaerobic Composition II was prepared, having the following approximate composition:

| Ingredient: | Approx. weight percent |
|---|---|
| Monomer A[1] | 56.5 |
| Triethyleneglycol dimethacrylate | 29.7 |
| Acrylic acid | 5.3 |
| Hydroxy propylmethacrylate | 4.5 |
| Cumene hydroperoxide | 2.7 |
| Benzoic sulfimide | 0.4 |
| Adhesive agent | 0.9 |
| Benzoquinone | (2) |

[1] Reaction product of 1 mole of diphenylmethylene diisocyanate with 2 moles of hydroxypropylmethacrylate.
[2] 200 parts per million by weight.

Anaerobic Composition II was split into two portions, one of which was allowed to serve as Control for future testing. The other portion (80 parts by weight) was mixed with the polyester plasticizer Harflex 330 from Example I (20 parts by weight). The tensile shear strength of the control and control plus polyester plasticizer samples then were tested in a standard tensile shear test for bond strength at various temperatures. In this test, two standard 1" x 5" steel lapstrips are bonded by the use of the composition in question. The bonded assemblies then are placed in an environmental chamber maintained at the indicated temperature. When the specimens themselves reach the indicated temperature, they are immediately tested to determine the tensile shear force required to separate the lapstrips, using a standard Instron tensile tester. Results are presented in Table II below:

TABLE II

| Temperature, °F. | Control, p.s.i. | Control plus polyester plasticizer, p.s.i. |
|---|---|---|
| −85 | 1,150 | 4,200 |
| 75 | 2,300 | 4,900 |
| 160 | 2,500 | 4,200 |
| 250 | 2,200 | 3,000 |

The above test indicates the sample containing the polyester plasticizer produced bonds which were much more durable at various temperatures, and particularly at very low temperatures. This indicates a less brittle and more impact resistant bond.

Example III

Anaerobic Adhesive Composition III was prepared, having the following approximate composition:

| Ingredient: | Approx. weight percent |
|---|---|
| Monomer B[1] | 30.5 |
| Monomer C[2] | 23.6 |
| Acrylic acid | 6.1 |
| Hydroxy propylmethacrylate | 36.3 |
| Cumene hydroperoxide | 2.6 |
| Tributyl amine | 0.3 |
| Adhesive agent | 0.6 |
| Benzoquinone | (3) |

[1] Reaction product of 2 moles of hydroxy propylmethacrylate with 1 mole of the reaction product of one mole hydrogenated "bisphenol–A" and 2 moles of toluene diisocyanate.
[2] Reaction product of 3 moles of hydroxy ethylmethacrylate with the 1 mole of the reaction product of polypropylene triol with 3 moles of toluene diisocyanate.
[3] 200 parts per million by weight.

Anaerobic Composition III then was divided into two parts, one of which was used as Control for testing. To the other portion (80 parts by weight) was added the Harflex 330 polyester plasticizer of Example I above (20 parts by weight). The Control and Control plus polyester plasticizer compositions then were tested in a standard solvent resistance test. The compositions were used to bond glass cylinders into glass base plates having cylindrical holes to accommodate the cylinders with approximately 1/1000 inch radial clearance. The bonded assemblies then were placed in a standard kitchen dishwasher and subjected to the normal wash cycle with water at an approximate temperature of 150° F. The wash cycles are continued until the glass assemblies can be separated by hand. In this test, the average number of cycles prior to bond failure for the Control sample was approximately 50. For the Control plus polyester plasticizer sample, the test was discontinued after 300 cycles with the glass assemblies still firmly bonded.

I claim:

1. An anaerobic composition comprising a polymerizable acrylate ester monomer, having the formula

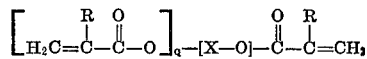

wherein R is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1, a peroxy polymerization initiator capable of polymerizing said monomer at room temperature in the substantial absence of oxygen, and from about 10% to about 30% by weight of said composition of a primarily aliphatic polyester plasticizer, having a structure corresponding to the condensation product of a dibasic acid with a diol and having an average molecular weight of from about 2,000 to about 15,000, the molecular weight of carbocyclic entities comprising not more than about 20% of the molecular weight of the polyester plasticizer.

2. An anaerobic composition comprising a polymerizable acrylate ester monomer, having the formula

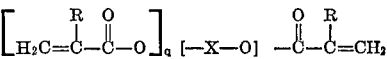

wherein R is a radical selected from the group consisting of hydrogen, halogen and alkyl of from 1 to about 4 carbon atoms; $q$ is an integer equal to 1–4; and X is an organic radical containing about 2–30 carbon atoms and having a total bonding capacity of $q$ plus 1, from about 0.1% to about 20% by weight of said composition of a hydroperoxy initiator capable of polymerizing said monomer at room temperature in the substantial absence of oxygen, and from about 10% to about 30% by weight of said composition of a polyester plasticizer having a structure corresponding to the condensation product of a dibasic acid with a diol and having an average molecular weight of from about 2,000 to about 15,000, the molecular weight of carbocyclic entities comprising not more than about 10% of the molecular weight of the polyester plasticizer.

3. The composition of claim 1 wherein the polymerizable acrylate ester is selected from the class consisting of polymerizable polyacrylate esters and polymerizable monoacrylate esters having a polar group in the alcoholic moiety thereof, and the peroxy polymerization initiator comprises from about 0.1% to about 10% by weight of the composition.

4. The composition of claim 2 wherein the polymerizable acrylate ester is selected from the class consisting of polymerizable polyacrylate esters and polymerizable monoacrylate esters having a polar group in the alcoholic moiety thereof, and the peroxy polymerization initiator comprises from about 0.1% to about 10% by weight of the composition.

5. The composition of claim 2 which additional contains an accelerator of free radical polymerization.

6. The composition of claim 5 wherein the accelerator is selected from the class consisting of organic sulfimides and organic amines.

7. The composition of claim 2 wherein the polyester plasticizer contains the repeating unit

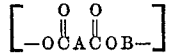

wherein A and B respectively represent the remaining atoms of the dibasic acid and diol starting materials for said polyester plasticizer, said repeating unit having a molecular weight of not greater than about 300.

8. The composition of claim 7 wherein the repeating unit has a molecular weight of not greater than about 225, and A and B are hydrocarbon.

9. The process of preparing an improved anaerobic composition which comprises mixing a polymerizable acrylate ester monomer, having the formula

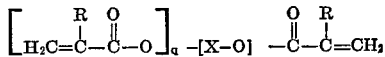

wherein R is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1, a peroxy polymerization initiator capable of polymerizing said monomer at room temperature in the substantial absence of oxygen, and adding thereto from about 10% to about 30% by weight of said composition of a primarily aliphatic the condensation product of a dibasic acid with a diol polyester plasticizer having a structure corresponding to and having an average molecular weight of from about 2,000 to about 15,000, the molecular weight of carbocyclic entities comprising not more than about 10% of the molecular weight of the polyester plasticizer.

10. A process for preparing improved bonded or sealed assemblies which comprises applying an anaerobic composition to a first surface, placing a second surface in an abutting relation to said first surface with the anaerobic composition between said first and second surfaces, and maintaining said first and second surfaces in said abutting relation until the anaerobic composition has cured to seal or bond said first and second surfaces; said anaerobic composition comprising a polymerizable acrylate ester monomer having the formula

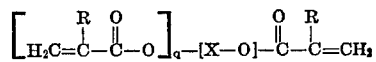

wherein R is a radical selected from the group consisting of hydrogen, halogen and alkyl of from 1 to about 4 carbon atoms; $q$ is an integer equal to at least 1; and X is an organic radical containing at least two carbon atoms and having a total bonding capacity of $q$ plus 1, from about 0.1% to about 20% by weight of said composition of a peroxy initiator capable of polymerizing said monomer at room temperature in the substantial absence of oxygen, and from about 10% to about 30% by weight of said composition of a polyester plasticizer having a structure corresponding to the condensation product of a dibasic acid with a diol and having an average molecular weight of from about 2,000 to about 15,000, the molecular weight of carbocyclic entities comprising not more than about 10% of the molecular weight of the polyester plasticizer.

References Cited

UNITED STATES PATENTS

| | | | |
|---|---|---|---|
| 3,419,512 | 12/1968 | Lees et al. | 260—29.7 R |
| 3,376,242 | 4/1968 | Clemens | 260—31.6 |
| 3,595,824 | 7/1971 | Aylesworth et al. | 260—31.6 |

MORRIS LIEBMAN, Primary Examiner

T. DE BENEDICTIS, SR., Assistant Examiner

U.S. Cl. X.R.

151—14.5; 260—31.8 H, 31.8 XA, 89.5 R